(12) United States Patent
Bergamasco et al.

(10) Patent No.: US 7,474,613 B2
(45) Date of Patent: Jan. 6, 2009

(54) METHODS AND APPARATUS FOR CREDIT-BASED FLOW CONTROL

(75) Inventors: Davide Bergamasco, Mountain View, CA (US); Silvano Gai, San Jose, CA (US); Thomas James Edsall, Cupertino, CA (US); Ray Kloth, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1057 days.

(21) Appl. No.: 10/205,668

(22) Filed: Jul. 25, 2002

(65) Prior Publication Data

US 2004/0027987 A1 Feb. 12, 2004

(51) Int. Cl.
*H04J 1/16* (2006.01)
*H04L 12/28* (2006.01)

(52) U.S. Cl. .............. 370/229; 370/235; 370/412

(58) Field of Classification Search ........ 370/229, 370/230, 252, 235, 412
See application file for complete search history.

(56) References Cited

U.S. PATENT DOCUMENTS

| | | | |
|---|---|---|---|
| 5,610,745 A | | 3/1997 | Bennett ............... 359/139 |
| 5,953,318 A | * | 9/1999 | Nattkemper et al. ....... 370/236 |
| 6,243,358 B1 | * | 6/2001 | Monin .................. 370/229 |
| 6,859,437 B2 | * | 2/2005 | Miller et al. ............ 370/235 |
| 7,042,842 B2 | * | 5/2006 | Paul et al. .............. 370/229 |
| 7,233,570 B2 | * | 6/2007 | Gregg .................. 370/235 |
| 2003/0016683 A1 | * | 1/2003 | George et al. ........... 370/404 |
| 2003/0074449 A1 | * | 4/2003 | Smith et al. ............ 709/226 |
| 2003/0227874 A1 | * | 12/2003 | Wang .................. 370/236 |

OTHER PUBLICATIONS

Search Report from PCT/US 03/21900 mailed Jan. 27, 2004; 3 pages.
Snively et al., "Fibre Channel Framing and Signaling (FC-FS) Rev. 1.70" NCITS working draft proposed American Standard for Information Technology, Feb. 8, 2002, chapter 5, pp. 37-50.
Chinese Office Action dated Sep. 7, 2007, Chinese Application No. 03817856.7.
Second Office Action from Chinese Patent Application No. 03817856.7 mailed Mar. 7, 2008.
Office Action from Australian Patent Application No. 2003249201 mailed Oct. 15, 2007.

\* cited by examiner

*Primary Examiner*—Firmin Backer
*Assistant Examiner*—Nittay Juntima
(74) *Attorney, Agent, or Firm*—Weaver Austin Villeneuve & Sampson LLP (57) ABSTRACT

Methods and apparatus are provided for credit-based flow control. Techniques allow a receiver to provide buffer characteristic information to a sender using a single extended receiver ready signal. Multiple credits can be allocated using a single extended receiver ready signal as well. Counters and registers are used to allow for the accidental loss of extended receiver ready signals while still maintaining an accurate reflection of the types and numbers of buffers available.

33 Claims, 10 Drawing Sheets

| Frame 301 | Ordered Set 311 | Ordered Set 313 | Ordered Set 315 | Ordered Set 317 | Ordered Set 319 | Ordered Set 321 | Frame 303 |

Figure 4

| Data Byte Name | 8 Bit Code | 10 Bit Code Negative Running Disparity | 10 Bit Code Positive Running Disparity |
|---|---|---|---|
| D0.0 | 000 00000 | 100111 0100 | 011000 1011 |
| D1.0 | 000 00001 | 011101 0100 | 100010 1011 |
| D2.0 | 000 00010 | 101101 0100 | 010010 1011 |
| D3.0 | 000 00011 | 110001 1011 | 001110 0100 |
| D4.0 | 000 00100 | 110101 0100 | 001010 1011 |
| D5.0 | 000 00101 | 101001 1011 | 101001 0100 |

Figure 5

| | Signal | Beginning Running Disparity | Ordered Set |
|---|---|---|---|
| 513 | Idle | Negative | K28.5 - D21.4 - D21.5 - D21.5 |
| 515 | Receiver Ready | Negative | K28.5 - D21.4 - D10.2 - D10.2 |
| 517 | Virtual Circuit Ready | Negative | K28.5 - D21.7 - VC_ID - VC_ID |
| 519 | Extended Receiver Ready | Negative | K28.5 - D21.0 - (Priority, Buffer Advertisement, Error Detection) |

METHODS AND APPARATUS FOR CREDIT-BASED FLOW CONTROL

BACKGROUND OF THE INVENTION

1. Field of the Invention

The present invention relates to credit-based flow control. More specifically, the present invention relates to methods and apparatus for efficiently and effectively providing buffer characteristic information to a sender using a credit-based transmission mechanism.

2. Description of Related Art

Many conventional network protocols use packet dropping to alleviate congestion at a network node. In one example, a network node in an IP based network receives input data from multiple sources at a rate exceeding its output bandwidth. In conventional implementations, selected packets are dropped to allow transmission of remaining packets within the allocated output bandwidth. The dropped packets are ultimately retransmitted under the control of a higher level protocol such as TCP.

In networks such as fibre channel networks, packet dropping is generally not allowed. Instead, networks such as fibre channel networks implement end-to-end and buffer-to-buffer flow control mechanisms. End-to-end and buffer-to-buffer flow control mechanisms do not allow a first network node to transmit to a second network node until a second network node is ready to receive a frame. The second network node typically indicates that it is ready to receive a frame by granting credits to the first network node. When frames are transmitted, credits are used. When no credits remain, the first network node can no longer transmit to the second network node. However, end-to-end and buffer-to-buffer flow control mechanisms provide only a very rough technique for providing credit information.

It is therefore desirable to provide methods and apparatus for improving credit-based flow control at network nodes in a network such as a fibre channel network with respect to some or all of the performance limitations noted above.

SUMMARY OF THE INVENTION

Methods and apparatus are provided for credit-based flow control. Techniques allow a receiver to provide buffer characteristic information to a sender using a single extended receiver ready signal. Multiple credits can be allocated using a single extended receiver ready signal as well. Counters and registers are used to allow for the accidental loss of extended receiver ready signals while still maintaining an accurate reflection of the types and numbers of buffers available.

In one embodiment, a method for flow control at a network switch is provided. A plurality of frames are received at a fibre channel switch from a first network node. The plurality of frames are forwarded. Credit information associated with the first network node is modified based on the number of frames forwarded. An extended receiver ready signal is provided to the first network node. The extended receiver ready signal includes credit information indicating to the first network node that a plurality of buffers are available to receive transmissions from the first network node.

In another embodiment, a network node coupled to a fibre channel switch is provided. The network node includes an input interface, an output interface, and a processor. The output interface is operable to transmit a plurality of frames to a fibre channel switch. The input interface is operable to receive an extended ready signal from the fibre channel switch. The extended ready signal includes credit information. A processor is coupled to the input interface and the output interface. The processor is configured to use the credit information to determine the number of buffers available to receive transmissions from the network node.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

The present invention relates to flow control in a network. More specifically, the present invention relates to methods and apparatus for improving a credit-based flow control scheme.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel used in a storage area network. However, it should be noted that the techniques of the present invention are applicable to a variety of different protocols and networks. Further, the solutions afforded by the invention are equally applicable to non-fibre channel networks. In one example, the techniques can apply to networks that generally do not allow packet dropping. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In typical implementations of a credit-based flow control scheme, a fibre channel switch ready to receive frames uses a ready signal such as a receiver ready signal to inform a transmitter that a new buffer has become available at the receiver. In one example, the receiver provides a credit with the receiver ready signal to the transmitter that the transmitter can use to send a packet.

Figure 1:
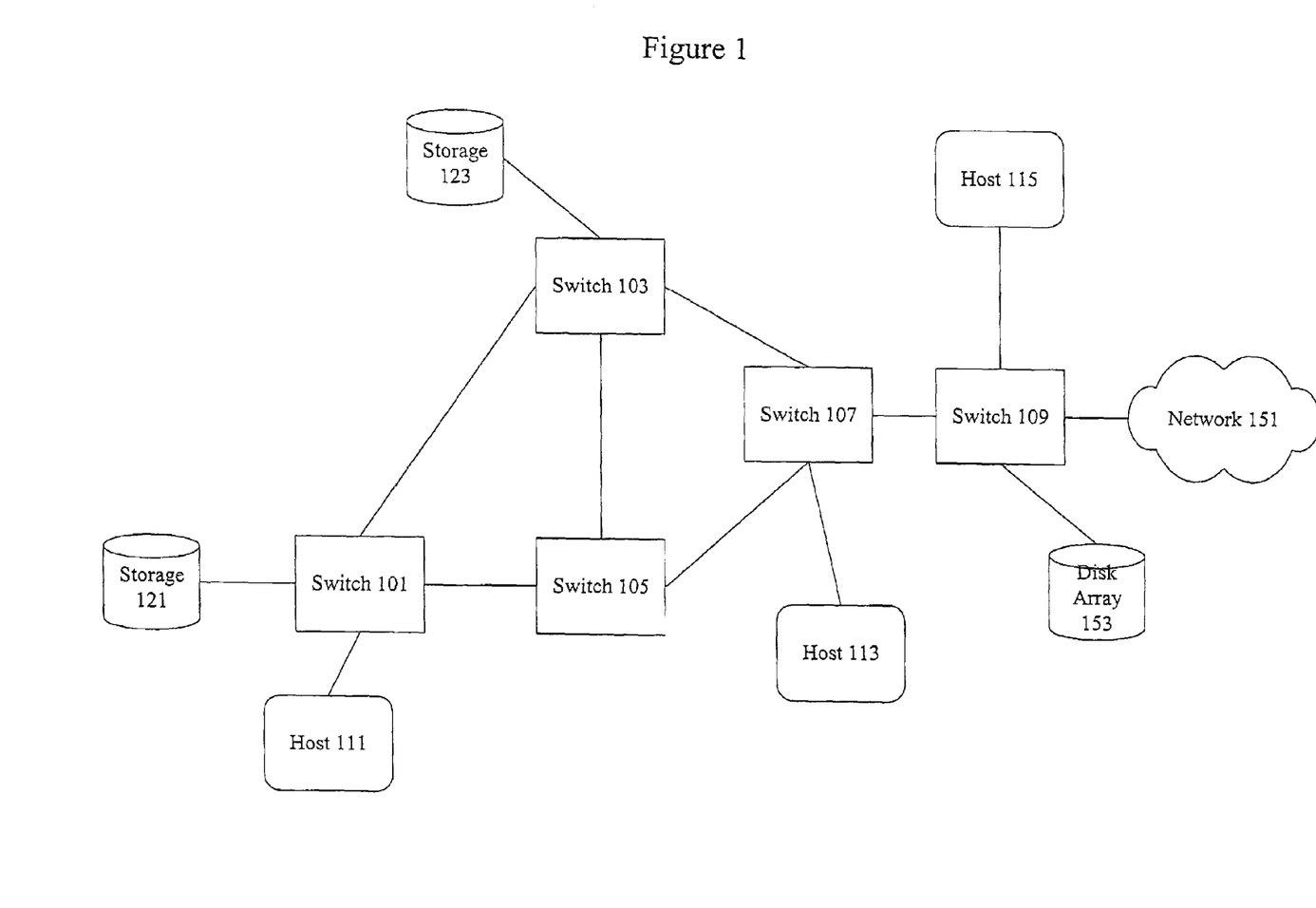
FIG. 1 is a diagrammatic representation of a network that can use the techniques of the present invention.

FIG. 1 is a diagrammatic representation of one example of a storage area network that uses a credit-based flow control scheme. A switch 101 is coupled to switches 103 and 105 as well as to a host 111 and storage 121. In one embodiment, host 111 is a server or client system while storage 121 is single disk or a redundant array of independent disks (RAID). Interconnected switches 103 and 105 are both coupled to switch 107. Switch 107 is connected to host 113 and switch 103 is connected to storage 123. Switch 109 is connected to host 115, switch 107, disk array 153, and an external network 151 that may or may not use fibre channel. In order for a host 111 to access network 151, one path that may be taken goes through switch 105.

As noted above, when a switch or router in a conventional IP network is congested, packets are dropped. Packets may be dropped randomly or selectively dropped with some degree of intelligence. By dropping packets, flows that were consuming a large amount of bandwidth will generally have more packets dropped than flows that were consuming a smaller amount of bandwidth.

Fibre channel, however, does not generally allow the dropping of packets. Instead, when a switch 109 is congested because of various reasons such as the failure or inability to receive more frames of a particular type, a buffer-to-buffer credit mechanism is used to control traffic flow from switch 107 to switch 109. Different types of frames may be frames of different priorities or classes. In typical implementations, a switch 109 allocates a predetermined number of credits to switch 107. Every time the switch 107 transmits frames of a particular type to switch 109, credits are used. A switch 109 can then allocate additional credits for traffic to switch 107 when the switch 109 has available buffers.

In one example, a switch 109 may be configured with 128 buffers for Priority 1 traffic and 128 buffers for priority 2 traffic. In another example, a switch 109 may have 64 buffers allocated to four different priorities of traffic. Conventional ready signals in credit-based flow control schemes only allow generic credits. In one example where the switch 109 has 128 buffers for priority 1 and 128 buffers for priority 2 traffic, switch 109 can only advertise that it has 128 buffers available even though it actually has 256 total buffers because of the possibility that the sender may transmit more than 128 frames of a particular class. That conventional ready signal does not distinguish between types of traffic sharing the same link. If switch 109 were to advertise 256 total buffers, switch 107 could potentially send 256 frames with priority 2 traffic even though only 128 of the 256 total buffers are designated for priority 2 traffic. Consequently, switch 107 can only advertise 128 buffers available for traffic regardless of traffic type. In one example, the buffers for priority 1 traffic in switch 109 may be full while the buffers for priority 2 traffic in switch 109 are empty.

Nonetheless, switch 107 is prevented from transmitting priority 2 traffic to switch 109 even though buffers for priority 2 traffic are available. Switch 107 is prevented from transmitting frames because switch 107 has used up all of its credits transmitting priority 1 traffic. When a switch 107 runs out of credits, it can no longer transmit to switch 109. Because of the failure or inability of a network 151 to receive more priority 2 frames, switch 109 and consequently switch 107 can not transmit to network 151. Head-of-line blocking occurs and the buffers in switch 109 and the link in the fibre channel network are both under-utilized.

A buffer-to-buffer credit mechanism is a very rough way of controlling traffic flow to a switch 109. The credit mechanism not only prevents traffic from traveling from switch 107 to switch 109 and subsequently to network 151, but it also prevents traffic from flowing from switch 107 to switch 109 to host 115 even though host 115 and its associated link may have the bandwidth to receive additional frames from switch 109. The buffer-to-buffer credit mechanism can result in the blocking of types of traffic that the switch may have the buffer capacity to handle.

It should be noted that frames are generally layer two constructs that include the layer three packet constructs. Frames and packets will generally be used interchangeably herein to describe network transmissions.

Because switch 107 can no longer transmit to switch 109, switch 107 may have to implement the same buffer-to-buffer credit mechanism with switches 103 and 105. When switches 103 and 105 can no longer transmit to switch 107, switches 103 and 105 may have to implement a buffer-to-buffer credit mechanism with switch 101. Congestion consequently can cascade throughout the network. The cascading congestion phenomenon can be referred to as congestion spreading.

Figure 2:
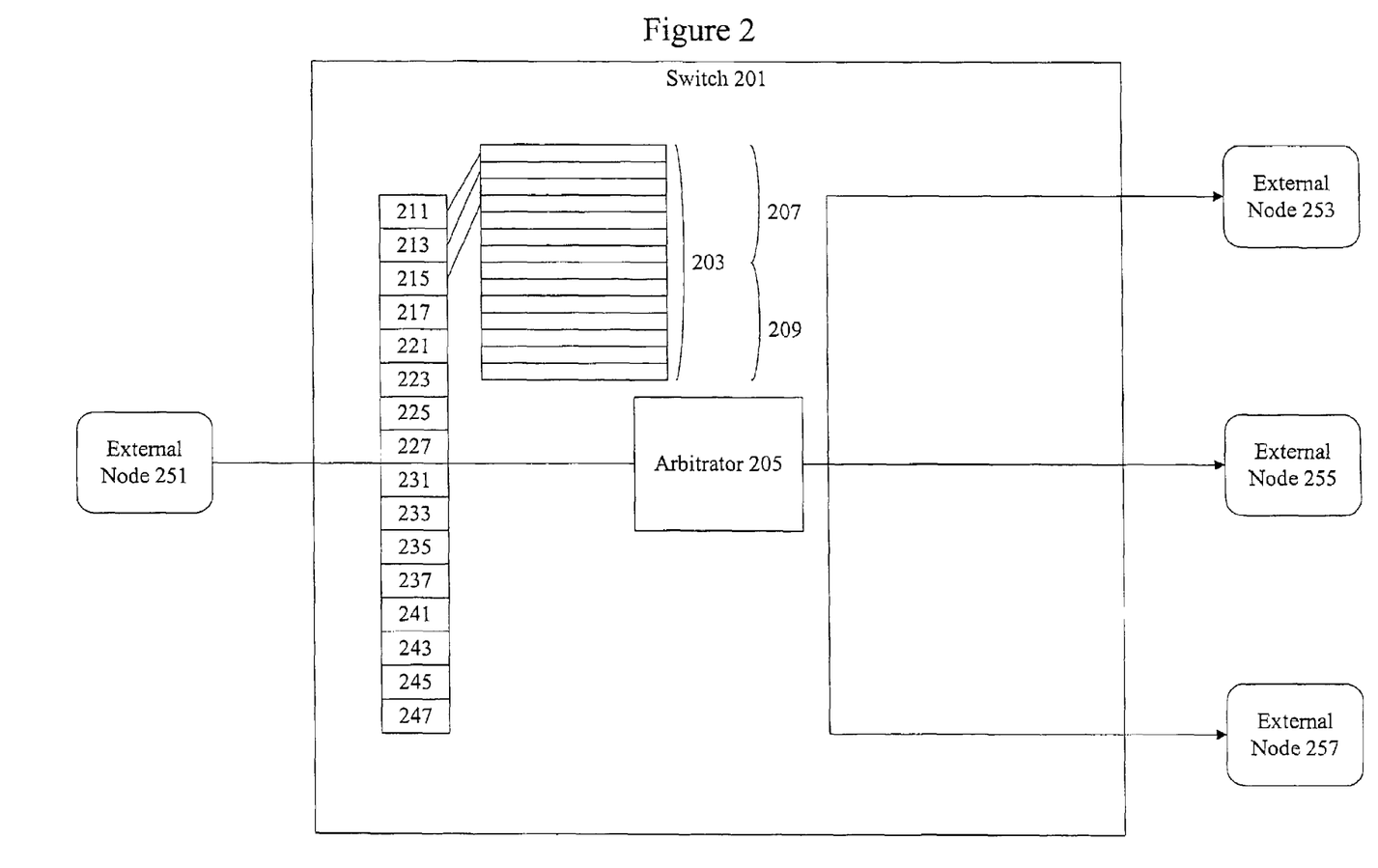
FIG. 2 is a diagrammatic representation showing head-of-line blocking.

FIG. 2 is a diagrammatic representation of a switch showing head-of-line blocking. A switch 201 is connected to external nodes 251, 253, 255, and 257. A buffer 203 is associated with external node 251. Buffers associated with external nodes 253, 255, and 257 are not shown for purposes of clarity. The buffer 203 includes a portion 207 configured to hold frames of a particular type, such as priority 1 frames, while portion 209 is configured to hold priority 2 frames.

In typical implementations, frames of all types destined for the various external nodes are all placed in the same buffer 203. Consequently, when a switch 201 receives a large volume of frames of a particular type such as priority 1, the portion 207 in the buffer 203 is consumed entirely. When the portion 207 is full, additional traffic from external node 251 is blocked because the switch 201 does not allocate additional credits to external node 251. Traffic that could be placed in buffer portion 209 is blocked as well even though space is available in portion 209.

According to various embodiments, the frames stored in buffer 203 are referenced by pointers in frame descriptor queues 211-247. Each frame descriptor can contain a pointer or reference identifying where the frame is stored in the buffer 203. Pointers or references to a shared buffer are herein referred to as descriptors. Descriptors can also identify other information such as frame priority or class.

In one example, an arbitrator 205 selects frames using a round-robin methodology. In a first round, a frame destined for external node 253 is selected. In a second round, a frame destined for external node 255 is selected, etc. More particularly, the arbitrator 205 may first select a high priority frame associated with descriptor 211 destined for external node 253, then select a high priority frame associated with descriptor 221 destined for external node 255, then select a high priority frame associated with descriptor 231 destined for external node 257, etc. It should be noted that a variety of techniques for selecting a frame can be used, as will be appreciated by one of skill in the art.

A queuing system having input buffers apportioned based on destination can be referred to as virtual output queuing (VOQ). VOQ is described further in Tamir Y., Frazier G.: "High Performance multi-queue buffers for VLSI communications switches", Proc. Of 15$^{th}$ Ann. Symp. On Comp. Arch., pp. 343-354, June 1988, the entirety of which is incorporated by reference for all purposes. As noted above, when the portion of shared buffer space associated with a particular external node becomes full due to traffic of a particular type, all traffic of any type from that particular external node is blocked. This can prevent traffic of a different type from flowing and cause cascading congestion. Consequently, it is desirable to provide techniques for more efficiently performing flow control and more effectively using the space in buffer 203. An abstraction identifying traffic with particular characteristics between two nodes is herein referred to as a flow. In one example, a flow is referenced by a source identifier, a destination identifier, a priority, a class, and an exchange identifier. Other characteristics are also possible. It should be noted, however, that a flow may also be referenced merely by a source and destination identifier.

In typical implementations, the receiver ready signal does not carry any information other than a single credit. That is, the receiver ready signal does not provide the transmitter with any information other than the fact that a single buffer is available. To indicate that multiple buffers are available, multiple ready signals are transmitted.

Typical credit-based flow control schemes provide that a single credit is provided for every frame received and forwarded. When a large number of buffers suddenly becomes available, a receiver switch can not typically convey this information to a sender in a fast an efficient manner. In one example, two idle ordered sets are transmitted before every receiver ready signal ordered set is transmitted.

Figure 3:
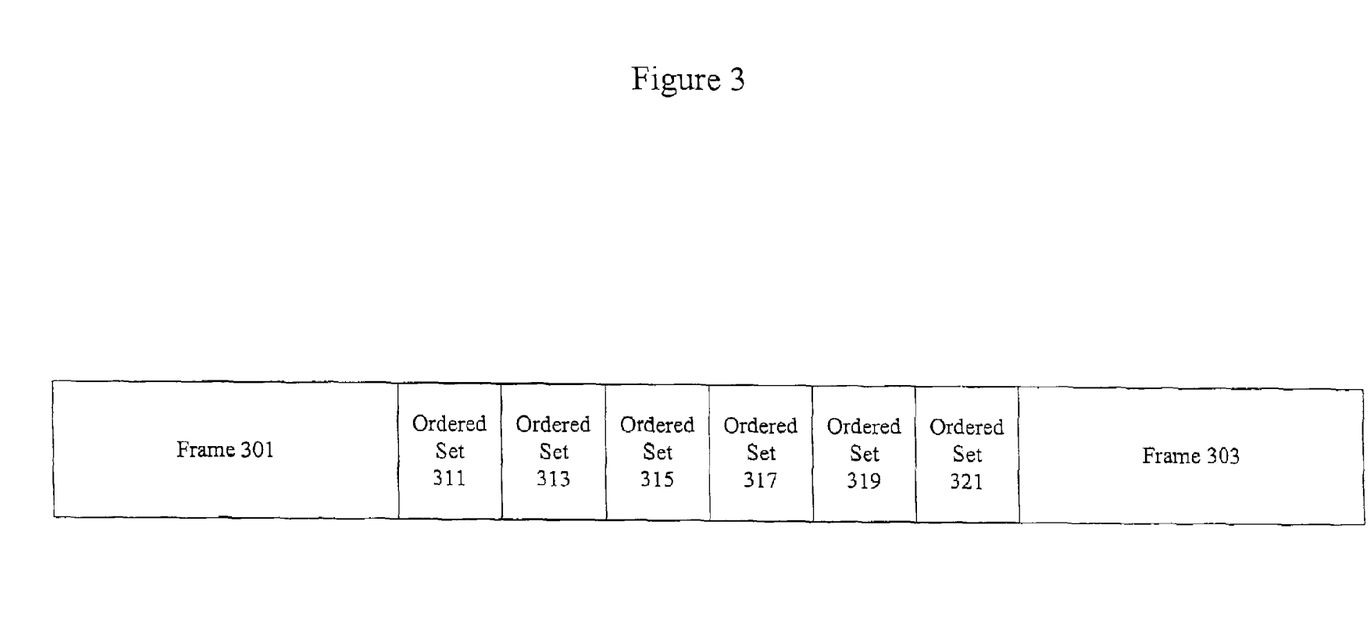
FIG. 3 is a diagrammatic representation showing ordered sets and frames.

FIG. 3 is a diagrammatic representation showing fibre channel frame transmission. Groups of data bits referred to herein as ordered sets are typically transmitted between fibre channel frames. Ordered sets contain control information conveyed between a sender and a receiver and help maintain link synchronization. Receiver ready signals are typically transmitted as ordered sets. Some versions of fibre channel specify having two idle signal ordered sets transmitted before every receiver ready signal ordered set. Having to transmit multiple idle ordered sets before transmitting a receiver ready signal ordered set uses valuable bandwidth in the fibre channel link. In one example, six ordered sets 311-321 are transmitted between frames 301 and 303. Receiver ready signals are configured in ordered sets 315 and 321 and idle signals are configured in ordered sets 311, 313, 317, and 319.

If a large number of buffers become available at once, the same number of receiver ready ordered sets would have to be transmitted to a sender before the appropriate number of credits are granted to the sender, since a receiver ready signal ordered set only grants a single credit to the sender. According to various embodiments, each ordered set is a 32-bit sequence transmitted to the sender or transmitter as 40 bits using fibre channel 8B/10B encoding. Fibre channel 8B/10B encoding is described in Fibre Channel Framing and Signaling (FC-FS), Rev. 1.70.

Fibre channel 8B/10B encoding is used because it is generally not desirable to transmit a long sequence of either zeros or ones over a particular link. Transmitting a long sequence of zeros or ones on a particular link can cause the sender and the receiver on a link to lose synchronization. By mapping 8-bit sequences into 10-bit sequences, transitions between ones and zeros can be increased. For example, a 00000001 sequence with a long sequence of zeros can be mapped to a 0111010100 sequence to increase transitions between zeros and ones.

Figure 4:
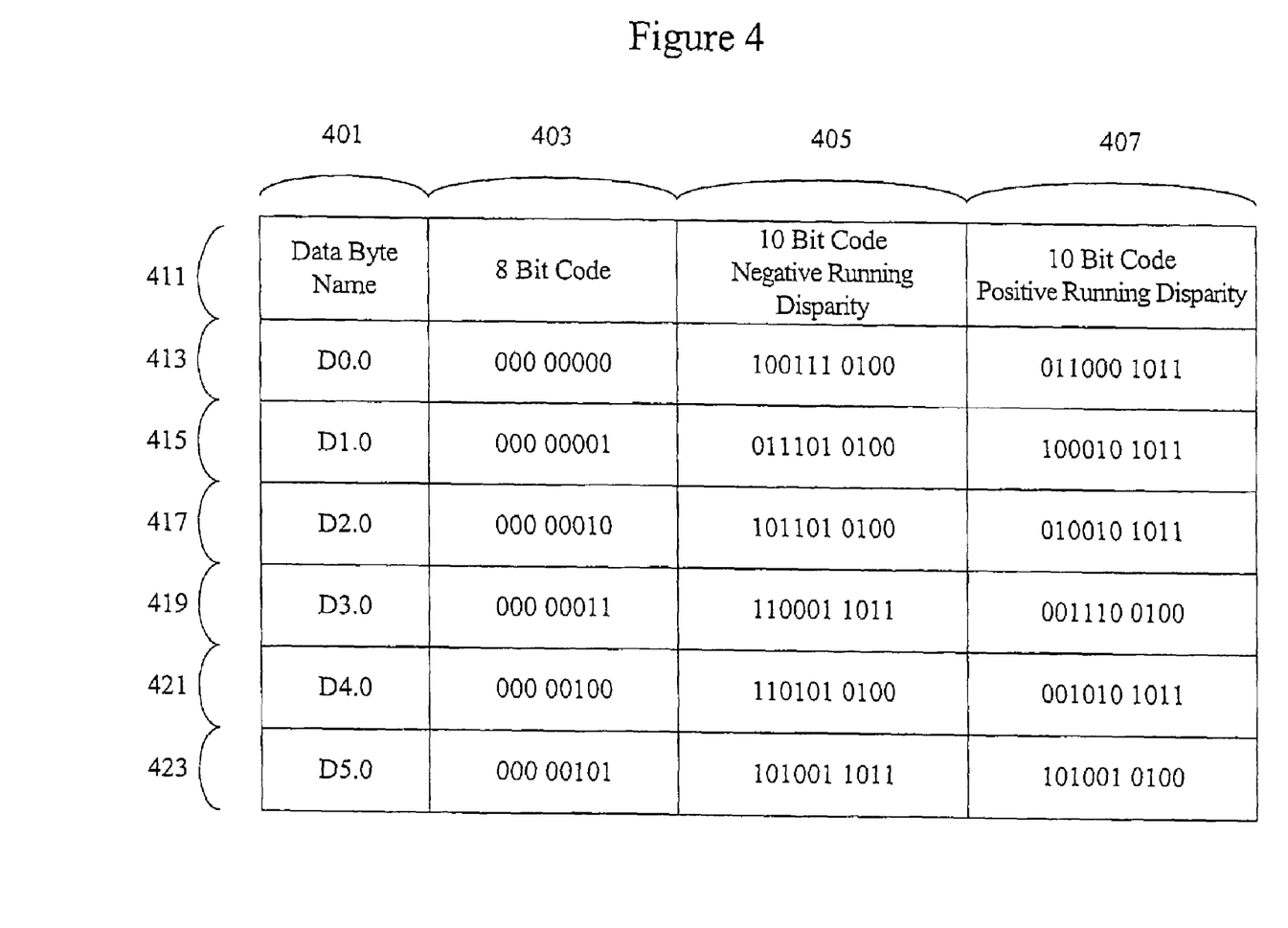
FIG. 4 is a diagrammatic representation showing 8b/10b notation.

FIG. 4 is a diagrammatic representation showing 8B/10B encoding. According to various embodiments, each ordered set transmitted between frames includes four data bytes shown in column 401. Each data byte has an 8-bit representation shown in column 403. The data byte is mapped to both a positive running disparity 10-bit code and a negative running disparity 10-bit code. The positive running disparity and the negative running disparity are used conventionally to maintain a proper balance between the number of ones and zeros transmitted on a particular link. In one example, the running disparity at the end of the prior sequence is positive if the sequence contains more ones than zeros or the sequence ends in 0011. The running disparity at the end of the prior sequence is negative if the prior sequence contains more zeros than ones or the sequence ends in 1100. Column 405 shows 10-bit sequences with negative running disparities and column 407 shows sequences with 10-bit positive running disparities. Running disparity can also be referred to herein as polarity. Each data byte is given a byte name. For example, data byte 00000100 is given the notation D4.0 and is represented as shown in row 421.

An ordered set includes four data bytes represented in 8B/10B form and are often referred to by data byte names. It should be noted that an ordered set containing 4 bytes is initially 32-bits and is mapped to 40-bits using 8B/10B notation.

Figure 5:
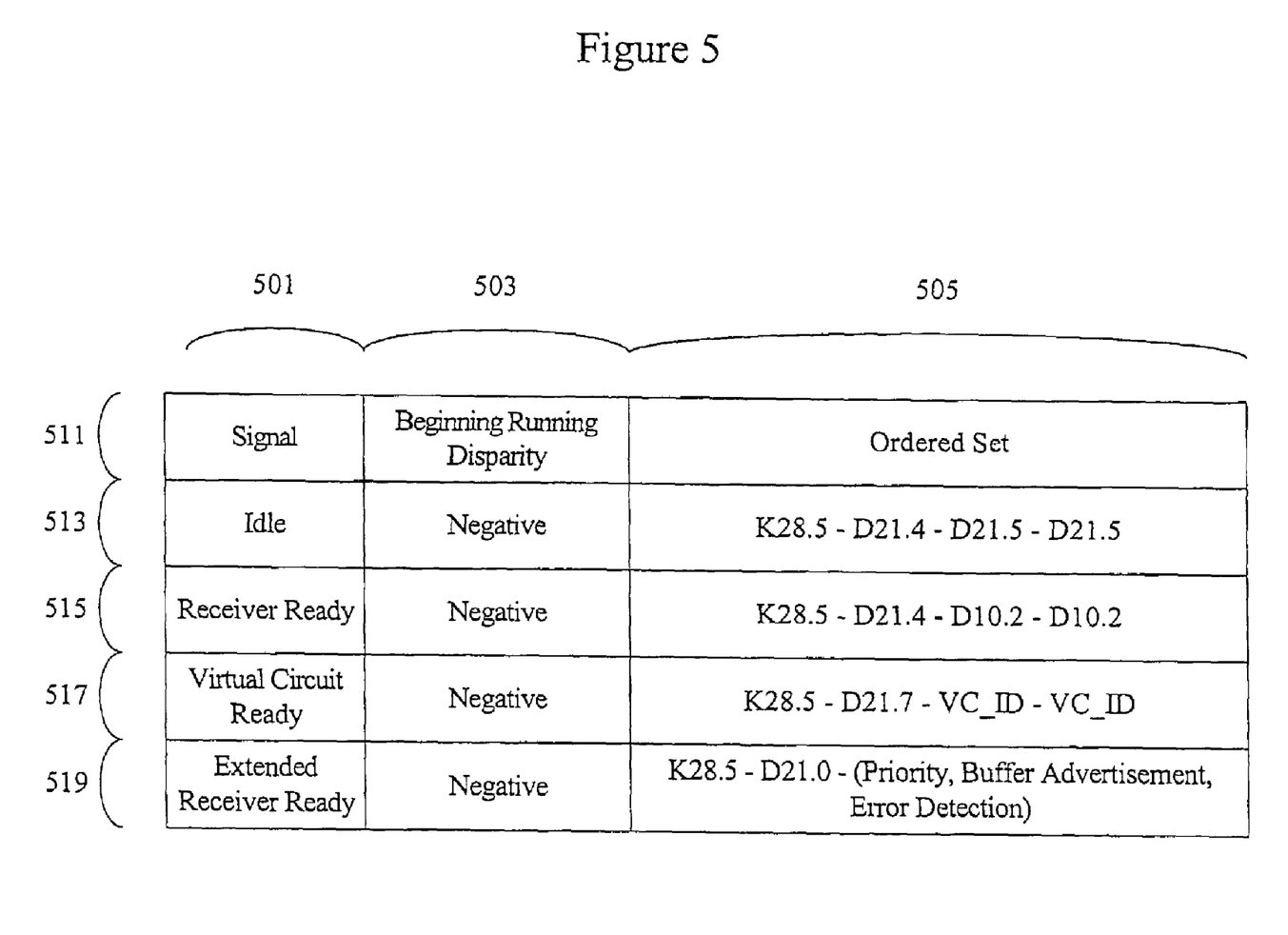
FIG. 5 is a diagrammatic representation showing some ordered sets.

FIG. 5 is a diagrammatic representation showing signals used for fibre channel transmission along with the representative ordered sets. For example, an idle signal is an ordered set including data bytes K28.5-D21.4-D21.5-D21.5 with a beginning running disparity of negative as shown in row 513. A typical receiver ready signal includes data bytes K28.5-D21.4-D10.2-D10.2. However, the typical receiver ready signal is only able to indicate to a sender that a single buffer is now available. The typical receiver ready signal does not convey any information on the type of buffer available, the number of buffers available, or the correctness of the receiver ready signal itself. According to various embodiments, the techniques of the present invention provide an extended receiver ready signal 519. In one embodiment, the extended receiver ready signal ordered set includes data bytes K28.5-D21.0 as well as two additional data bytes, forming a 16-bit sequence, which conveys priority, buffer advertisement, and error detection information.

Such an ordered sets using 8B/10B encoding provides one technique for a receiver switch to convey information about an available buffer to a sender while maintaining link synchronization. However, it should be noted that the techniques of the present invention apply to a variety of protocols, constructs, etc. The techniques of the present invention apply to any situation where a receiver is providing information to a sender about a buffer being available for receipt of a transmission. In one example, the techniques of the present invention apply to ordered sets transmitted without 8B/10B form. In another example, the techniques of the present invention apply to asynchronous links. In still other examples, ordered sets may not be transmitted between frames and control information may be conveyed in frames themselves. The specific signals as well as the specific ordered sets used to represent the signals may also vary widely.

Figure 6:
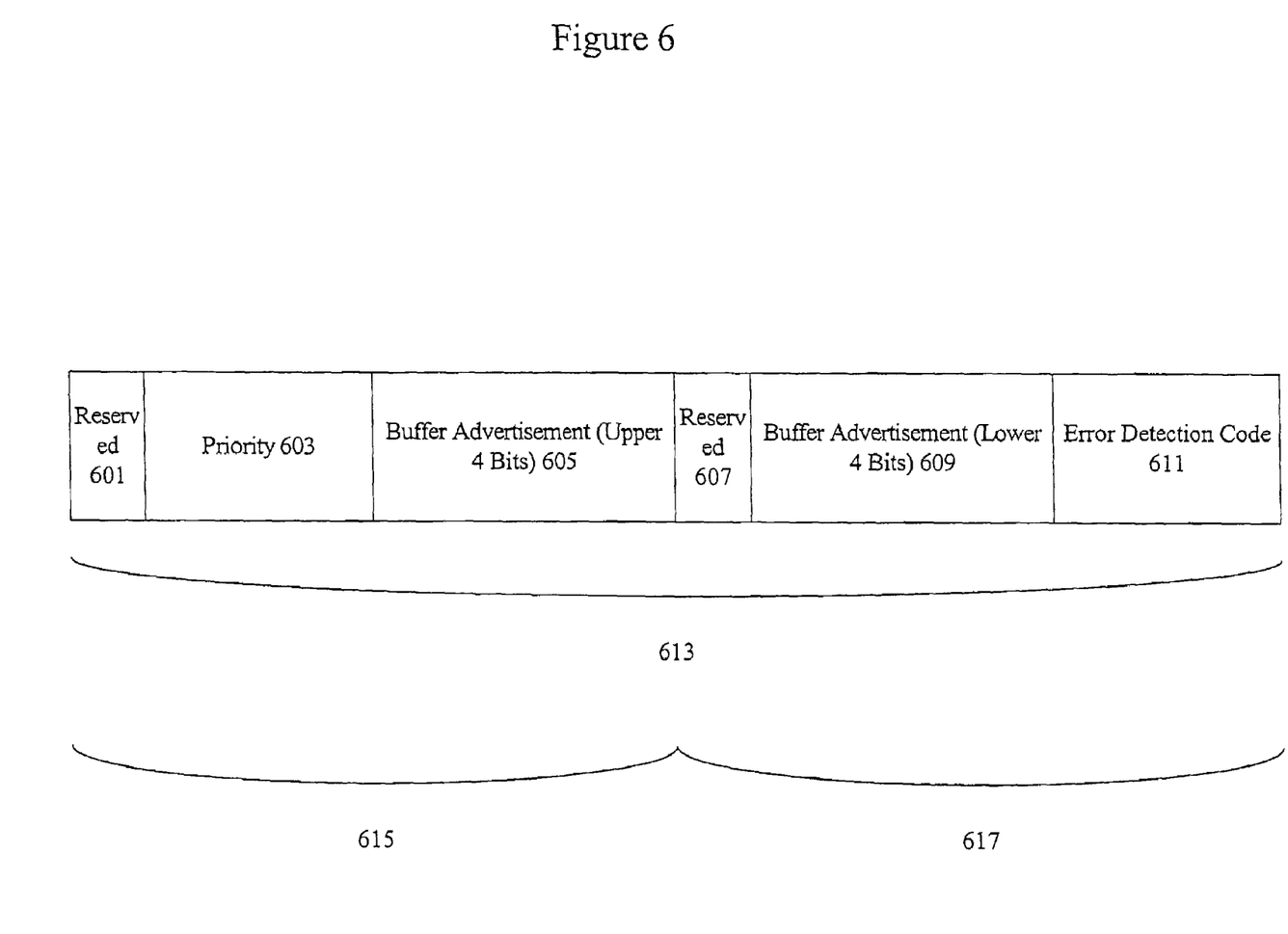
FIG. 6 is a diagrammatic representation showing an extended ready signal ordered set.

The techniques of the present invention provide a mechanism for a receiver to inform a sender about characteristics of its available buffers in a reliable and efficient manner. FIG. 6 is a diagrammatic representation showing one example of a format that can be used to effectively and efficiently inform a sender about buffer characteristics. According to various embodiments, the 16-bit sequence 613 is represented as two separate 8-bit sequences 615 and 617 in 8B/10B form. The 16-bit sequence 613 includes a reserved bit 601, a 3-bit priority sequence 603, the upper 4 bits of an 8-bit buffer advertisement sequence 605, another reserved bit 607, the lower 4 bits of the 8-bit buffer advertisement sequence 609 and an error detection code 611. The 8-bit sequences 615 and 617 must be represented by 8B/10B codes having a neutral disparity in order to ensure a negative running disparity at the end of the extended receiver ready ordered set. Therefore, the 7-bit subsequences formed by 603 and 605 and by 609 and 611 are to be mapped in 8-bit sequences whose 8B/10B form has a negative running disparity. A possible mapping can be the one described in Table K.1, at Page 123 of FC-AL Rev. 7.0 Amendment available from www.t10.org. The entirety of the FC-AL Rev. 7.0 Amendment is incorporated by reference for all purposes.

In one example, the error detection code 611 is a 3-bit sequence that allows for the detection of triple bit errors in the transmitted sequence, excluding the reserved bits. In one example, the error detection code 611 is a Cyclic Redundancy Code (CRC). Such codes are described in Computer Organization & Design by John L. Hennessy and David A. Patterson (ISBN: 1558604286), the entirety of which is incorporated by reference for all purposes.

Although a 3-bit error detection code 611 is provided in one embodiment, a variety of CRC codes, checksums, and parity bits can also be used. In one example, no error correction code is included in the ready signal.

The extended receiver ready signal also includes bits for maintaining the priority associated with the buffers being advertised as available. The 3 priority bits 603 convey information to the sender on the priority of the credits being conveyed. Although the described embodiment provides one technique for effectively conveying information about multiple buffers being available the receiver as well as conveying characteristic information such as priority or class, a wide variety of formats are contemplated. In one example, no priority bits are included and instead the bits are used to distinguish classes of traffic.

According to various embodiments, the extended receiver ready signal also includes a buffer advertisement, resulting from the concatenation of the upper four bits buffer advertisement 605 and lower four bits buffer advertisement 609, in the 16-bit sequence 613. Such buffer advertisement provides a relative count of the number of buffers available for receipt of transmissions.

In one implementation, the buffer advertisement may contain the number of buffers just released and now available for receipt of transmissions from a sender. For example, a receiver fibre channel switch may have just forwarded six frames to a next node in a fibre channel fabric. As the six frames are forwarded, six buffers are now available to receive transmissions from a sender. In typical implementations, six receiver ready signal ordered sets separated by at least two idle signal ordered sets would have to be transmitted to the sender. According to various embodiments, a receiver switch can advertise the fact that six buffers are now available to receive transmissions using a single extended receiver ready signal. When the sender receives an extended ready signal buffer advertisement, the sender knows that it has six additional credits with which to forward frames to the receiver switch.

However, the scheme has disadvantages. Although transmission in a fibre channel fabric is relatively reliable, the extended receiver ready signal may be corrupted, or otherwise lost, during the transmission from the receiver switch to the sender switch. If the extended receiver ready signal is lost, the sender switch would not get the information that the six buffers are now available. Six credits are lost. When the receiver switch forwards an additional four frames to a next node and provides four additional credits to the sender switch, the sender switch gets four additional credits, but the six credits that were lost remain unaccounted for.

Figure 7:
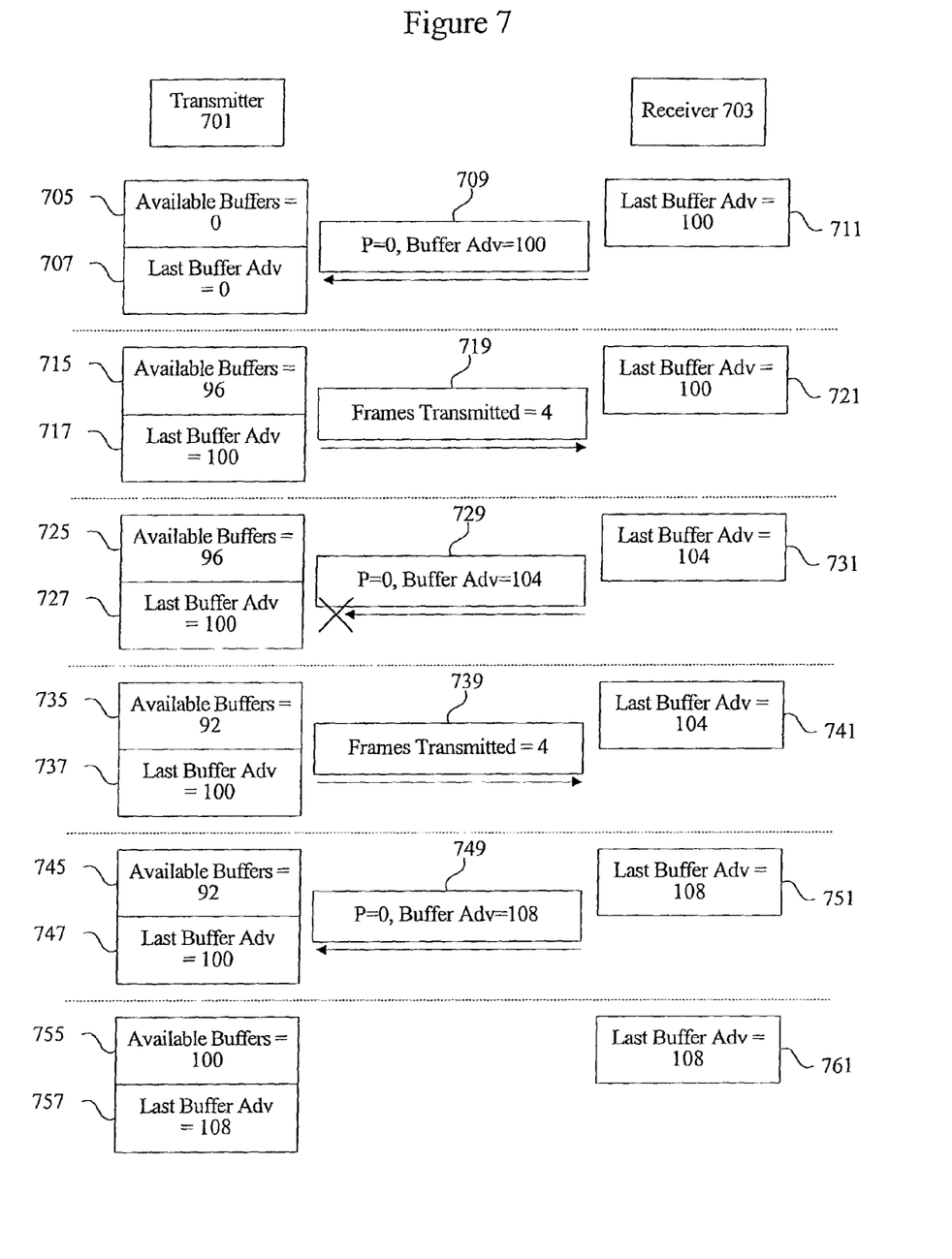
FIG. 7 is a diagrammatic representation of an exchange between a receiver fibre channel switch and a transmitter fibre channel switch.

FIG. 7 is a transaction diagram showing a technique for tracking the number of available buffers effectively even if an extended receiver ready signal is lost. Any signal for conveying information to a sender or transmitter switch that a receiver has multiple buffers now available to receive transmissions is referred to herein as an extended receiver ready signal. Any network node configured to provide the receiver ready signal or an extended receiver ready signal is referred to herein as a receiver. Any network node using credits to forward frames to a receiver is referred to herein as a transmitter or a sender. Transmitter and sender are used interchangeably herein. According to various embodiments, a transmitter 701 and a receiver 703 are connected by a fibre channel link. To initialize a link, the receiver 703 provides an extended receiver ready signal 709 to the transmitter 701 indicating that 100 total buffers are available in the receiver 703 to receive transmissions of priority zero from a transmitter. The receiver 703 maintains a register 711 that keeps track of the last buffer advertisement sent to the transmitter. This register is reset to zero every time the link is reset. After sending the extended receiver ready signal 709, the receiver 703 updates the last buffer advertisement register 711 with a count of 100 buffers.

The transmitter 701 includes two counters or registers 705 and 707 tracking the number of available buffers and the last buffer advertisement received from the receiver 703. These two registers are reset to zero every time the link is reset. After the extended receiver ready signal 709 is received, the last buffer advertisement is set to 100 in counter 717. The transmitter forwards four frames 719 to the receiver 703. When the four frames are transmitted, counter 715 indicating the number of buffers available to the sender is decremented to 96. The last buffer advertisement counter 721 in the receiver switch 703 remains at 100. After the receiver 703 forwards the four frames, the last buffer advertisement counter 731 is incremented to 104. An extended receiver ready signal 729 is sent to the transmitter 701. The extended ready signal 729 includes information indicating that a relative count of 104 buffers are available at the receiver 703. However, the extended ready signal 729 may never arrive at the transmitter 701.

The available buffers counter 725 remains at 96 even though the number of available buffers should now be increased to 100. If the extended receiver ready signal had arrived, the number of available buffers would have been increased to 100, which accurately reflects the number of available buffers in the receiver. The last buffer advertisement counter 727 remains at 100. The transmitter 701 then proceeds to forward four additional frames to the receiver 703. The counter 735 indicating the number of available buffers is decremented to 92. The last buffer advertisement counter 737 remains at 100 because the last buffer advertisement successfully received arrived in ordered set 709. The last buffer advertisement counter 741 in the receiver switch 703 remains at 104. After the receiver switch 703 forwards the four frames to a next node, four buffers are now again available. The receiver 703 provides an extended receiver ready signal 749 with a buffer advertisement of 108. The receiver switch 703 updates the last buffer advertisement counter 751 to indicate that the last buffer advertisement 108 was provided in the extended receiver ready signal 749.

When the extended ready signal 749 arrives at transmitter switch 701, the last buffer advertisement counter 747 is subtracted from the buffer advertisement in the extended ready signal 749. That is, the value of 100 is subtracted from the value 108. The difference of eight indicates the number of buffers that have been made available since the last extended receiver ready signal was successfully received. In this example, the difference of eight indicates the number of buffers made available since the last extended ready signal 709 was received at the transmitter 701. The difference is added to the available buffers counter 745 to yield a total of 100 available buffers indicated in counter 755. The total of 100 available buffers accurately reflects the number of buffers available in the receiver 703. The last buffer advertisement counter 757 is set to equal the buffer advertisement in the extended ready signal 749.

By maintaining an available buffers counter as well as a last buffer advertisement counter, the number of buffers available in the receiver can be accurately tracked even if several extended ready signals are lost. Any mechanism for tracking the number of buffers available for receipt of frames from a transmitter is referred to herein as an available buffers counter. Any mechanism for tracking the last buffer advertisement provided is referred to herein as a last buffer advertisement counter.

By using a relative buffer advertisement counter, extended receiver ready signals can be lost while still accurately conveying the number of available buffers to a transmitter 701. However, there is a limit on how many signals can be dropped because there is a limited number of bits in an extended receiver ready signal in which buffer advertisement information can be conveyed. Similarly, there may be a limited number of bits in the available buffers counter as well as the last buffer advertisement counter in which to hold information. At some point, the buffer advertisement counter rolls over and becomes zero again. For example, an 8-bit buffer advertisement sequence holds 256 values, from 0 throughout 255. When the buffer advertisement reaches 256, the counter rollover occurs and the buffer advertisement becomes zero again. In extreme circumstances, it is contemplated that so many extended receiver ready signal are lost that the transmitter 701 does not get an accurate picture of the number of available buffers in the receiver 703 because the counter rolls over. Getting an inaccurate picture of the number of buffers available because of counter roll over is referred to herein as aliasing.

For example, in a situation where eight bits are provided to hold a buffer advertisement, the maximum number of buffers that can be advertised is 256. The receiver may wish to indicate that 130 buffers are available and provide that number in an extended receiver ready signal. However, if the extended receiver ready signal is lost, the counter at the receiver will potentially rollover and become zero again if the receiver needs to advertise a number of buffers greater than 256–130=126. If the receiver wants to advertise 130 more buffers being available, the buffer advertisement in the receiver ready signal will not be 260 (130+130), but instead would equal 4 (a rolled over 256+4 is equal to 260).

Consequently, if a system is to be designed to allow for the loss of a single extended receiver ready signal, the maximum allowed buffer advertisement would be 127 or a smaller fraction of the capacity of the buffer advertisement in the extended ready signal. If the system is to be designed to allow for the loss of two extended ready signals in a row, the maximum allowed buffer advertisement would be 85, or one third of the maximum buffer advertisement. In a system designed to allow for the loss of three extended ready signals in a row, the maximum allowed buffer advertisement would be 63. Table 1 shows the relation between maximum number of extended receiver ready signals that can be dropped and the maximum number of buffers that can be advertised in the extended receiver ready signal having an 8-bit buffer advertisement space.

TABLE 1

Maximum Number Of Buffers Advertised

| Maximum Allowed Number Of Extended Ready Signals Dropped | Buffer Advertisement Rollover | Maximum Number Of Buffers Advertised |
|---|---|---|
| 1 | 256 | <256/2 → 127 |
| 2 | 256 | <256/3 → 85 |
| 3 | 256 | <256/4 → 63 |
| 4 | 256 | <256/5 → 51 |

Figure 8:
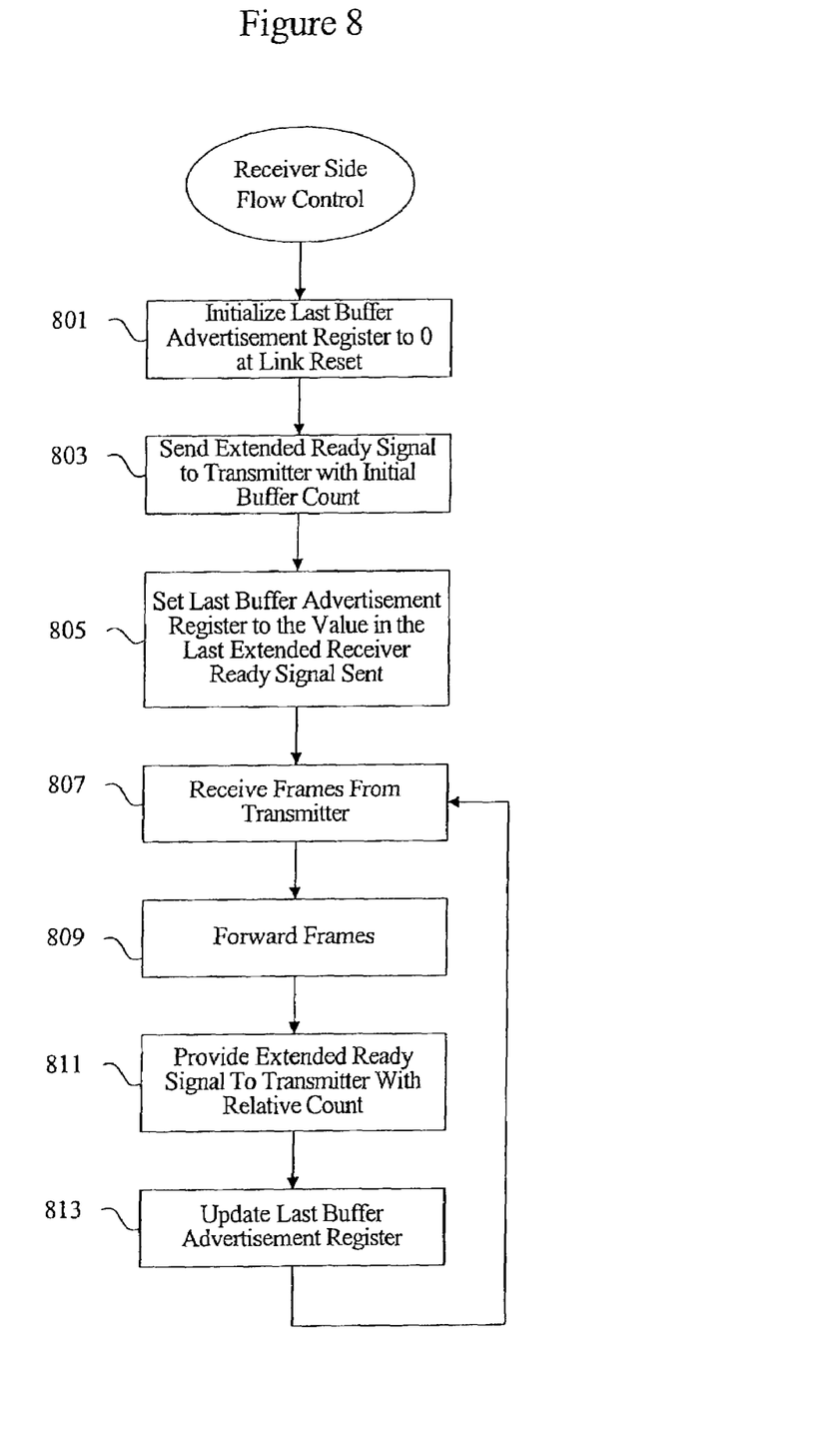
FIG. 8 is a flow process diagram showing credit-based flow control at a receiver fibre channel switch.

FIG. 8 is a flow process diagram showing one example of receiver side flow control. At 801, the receiver fibre channel switch sets the last buffer advertisement register to zero upon link reset. At 803, the receiver switch sends one extended receiver ready signal to the transmitter indicating the initial number of buffers available to a sender for transmission of frames of a particular type, e.g. Class 1 or priority 2 frames. At 805, the receiver switch initializes its own last buffer advertisement register or counter. According to various embodiments, the last buffer advertisement register contains a rolling count of the number of buffers available and used at a receiver switch. In one example, if a receiver switch includes 100 buffers, the last buffer advertisement register would initially contain a value of 100. If four buffers are used to hold frames from a sender and the frames are eventually forwarded, the last buffer advertisement register would be incremented to a value of 104. At 807, the receiver switch receives frames from the transmitter. At 809, the frames are forwarded to a next node.

At 811, an extended receiver ready signal is provided to the transmitter. According to various embodiments, the extended receiver ready signal includes a relative scope along with a relative count indicating the number of buffers freed since the last buffer advertisement was sent out. At 813, the last buffer advertisement register is updated. It should be noted that the techniques of the present invention do not necessarily have to be performed in the steps provided in flow process diagram's herein. For example, the last buffer advertisement register can be updated before an extended receiver ready signal is provided to the transmitter.

Figure 9:
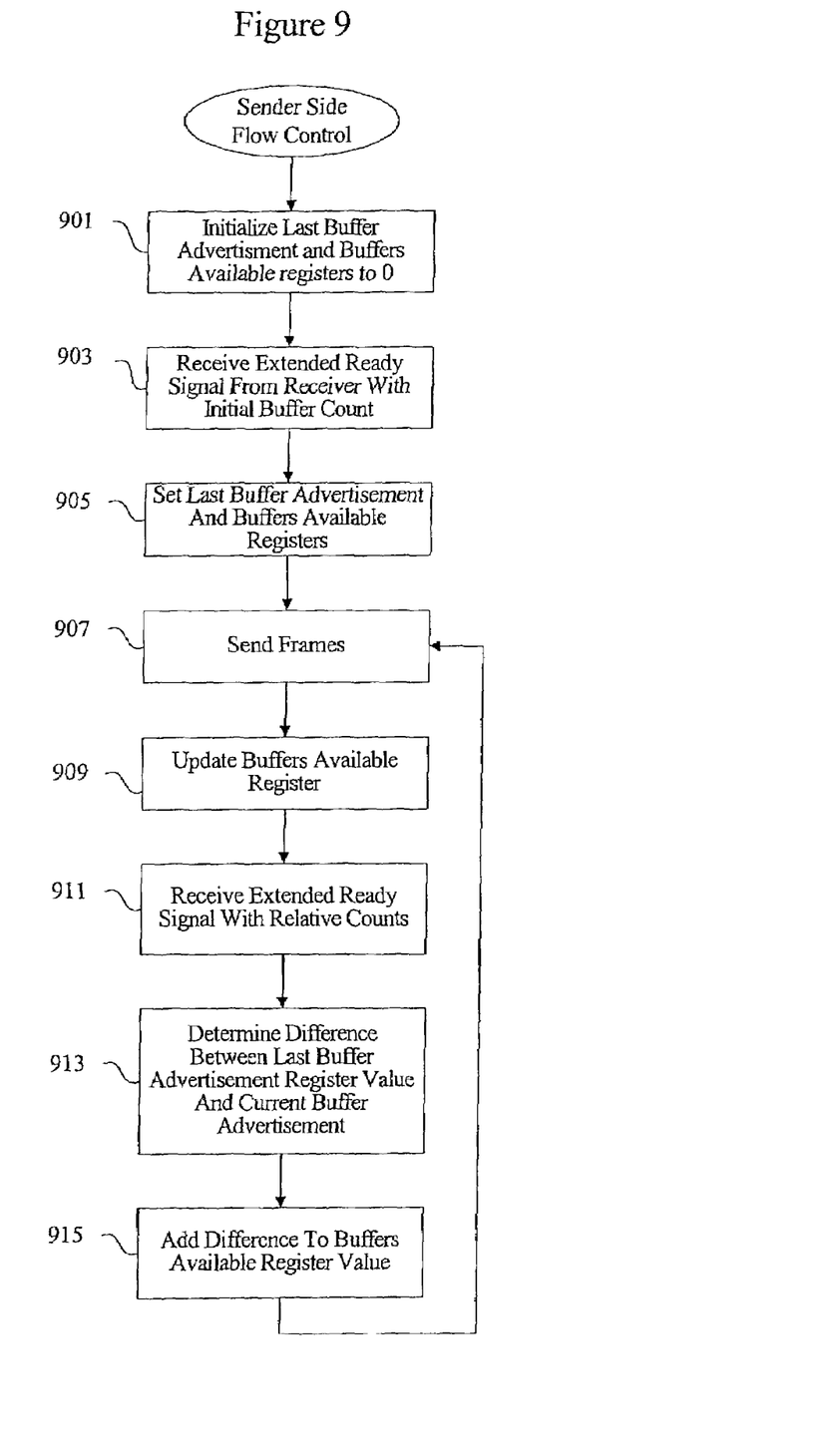
FIG. 9 is a flow process diagram showing credit-based flow control at a transmitter fibre channel switch.

FIG. 9 is a flow process diagram showing one example of sender side flow control. At 901, the sender switch receives initializes the last buffer advertisement and the buffer available to zero. At 903, the sender switch receives an extended a receiver ready signal from a receiver switch. According to various embodiments, the extended receiver ready signal contains the count indicating the initial number of buffers available at a receiver switch to receive frames from the sender. At 905, the sender switch computes the difference between the buffer advertisement in the extended receiver ready signal and the last buffer advertisement counter to determine the initial number of buffers available at the receiver switch. This number is added to the available buffer counter. At 907, frames are forwarded. At 909, the buffers available register is updated based on the number of frames transmitted at 907. For example, if four frames were transmitted, the buffers available counter is decremented by four. At 911, an extended receiver ready signal is received with a buffer advertisement.

At 913, the difference between the buffer advertisement in the extended receiver ready signal and the last buffer advertisement register is determined. At 915, the difference is used to update the buffers available register value. For example, if the last buffer advertisement value was 100 and the buffer advertisement in the recently received extended ready signal is 104, the difference of 4 is added to the available buffers register value.

As described above, flow control may be performed in a variety of network devices or switches. According to various embodiments, a switch includes a processor, network interfaces, and memory for maintaining FIBs. A variety of ports, Media Access Control (MAC) blocks, and buffers can also be provided as will be appreciated by one of skill in the art.

Figure 10:
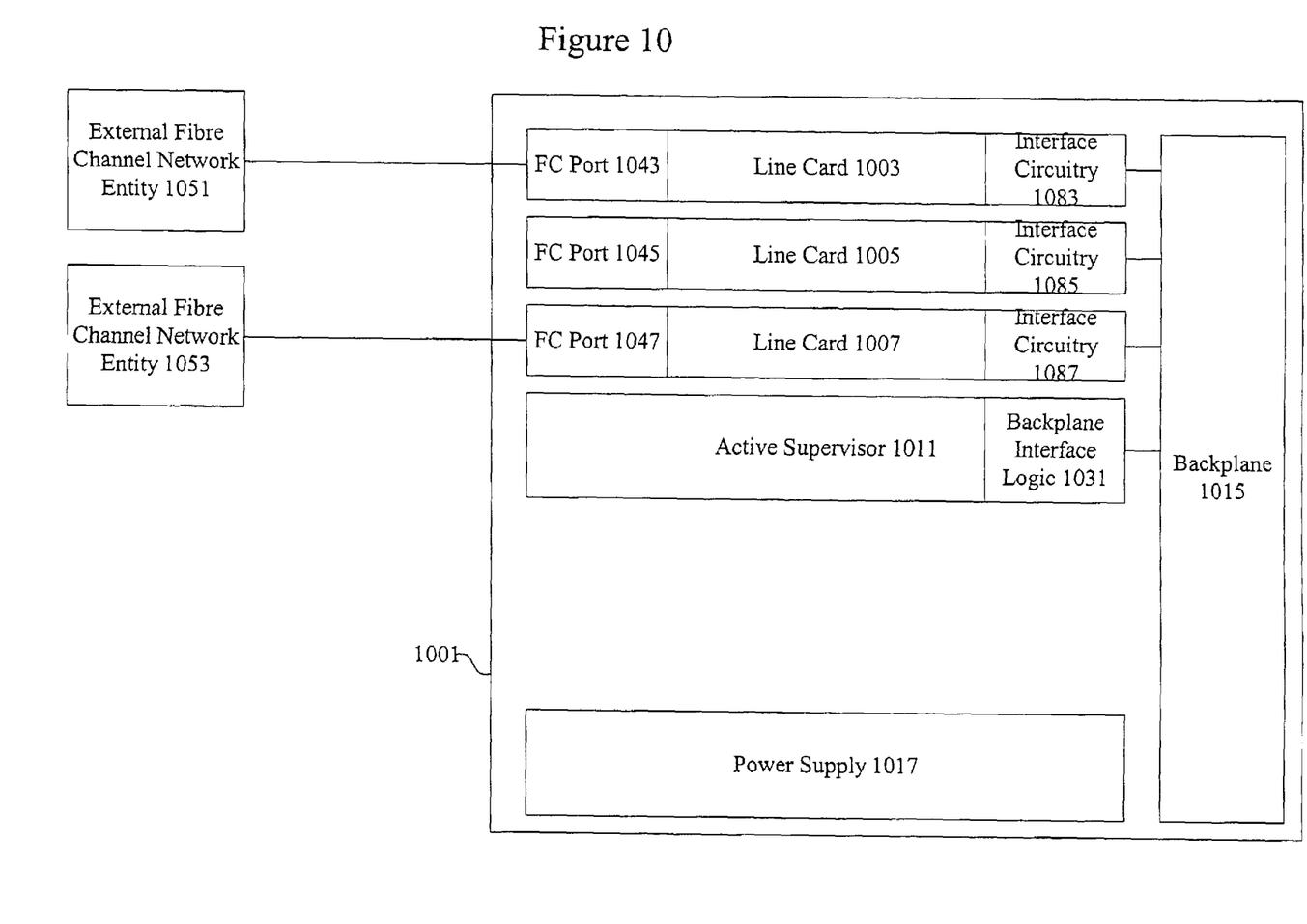
FIG. 10 is a diagrammatic representation of a fibre channel switch.

FIG. 10 is a diagrammatic representation of one example of a fibre channel switch that can be used to implement techniques of the present invention. Although one particular configuration will be described, it should be noted that a wide variety of switch and router configurations are available. The fibre channel switch 1001 may include one or more supervisors 1011. According to various embodiments, the supervisor 1011 has its own processor, memory, and storage resources.

Line cards 1003, 1005, and 1007 can communicate with an active supervisor 1011 through interface circuitry 1083, 1085, and 1087 and the backplane 1015. According to various embodiments, each line card includes a plurality of ports that can act as either input ports or output ports for communication with external fibre channel network entities 1051 and 1053. The backplane 1015 can provide a communications channel for all traffic between line cards and supervisors. Individual line cards 1003 and 1007 can also be coupled to external fibre channel network entities 1051 and 1053 through fibre channel ports 1043 and 1047.

External fibre channel network entities 1051 and 1053 can be nodes such as other fibre channel switches, disks, RAIDS, tape libraries, or servers. It should be noted that the switch can support any number of line cards and supervisors. In the embodiment shown, only a single supervisor is connected to the backplane 1015 and the single supervisor communicates with many different line cards. The active supervisor 1011 may be configured or designed to run a plurality of applications such as routing, domain manager, system manager, and utility applications.

According to one embodiment, the routing application is configured to provide credits to a sender upon recognizing that a frame has been forwarded to a next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method comprising:
receiving a plurality of frames at a fibre channel switch from a first network node;
forwarding the plurality of frames;
modifying credit information associated with the first network node based on the number of frames forwarded; and
providing an extended receiver ready signal including the credit information to the first network node, the extended receiver ready signal including the credit information indicating to the first network node that a plurality of buffers are available to receive transmissions from the first network node, wherein the first network node does not send a frame to the fibre channel switch unless the first network node has a credit available, wherein the first network node further maintains a credit value indicating the number of buffers available to receive transmissions from the first network node, a credit difference calculated by subtracting a last buffer advertisement from a current buffer advertisement received from the fibre channel switch and adding the credit difference to the credit value.

2. The method of claim 1, wherein the extended receiver ready signal further includes priority information.

3. The method of claim 2, wherein the priority information is used to differentiate amongst eight levels of priority.

4. The method of claim 1, further comprising providing an initialization extended receiver ready signal to the first network node before receiving the plurality of frames.

5. The method of claim 4, wherein the initialization extended receiver ready signal includes initialization credit information.

6. The method of claim 4, wherein the initialization credit information is a buffer advertisement for determining an initial number of credits available to the first network node.

7. The method of claim 6, wherein each credit allows the first network node to transmit a single frame.

8. The method of claim 5, wherein the initialization credit information is a buffer advertisement for determining an initial number of buffers available for receipt of frames from a first network node.

9. The method of claim 1, wherein the credit information is a buffer advertisement for determining a relative number of credits available to the first network node.

10. The method of claim 9, wherein the credit information is a buffer advertisement for determining a relative number of buffers available for receipt of frames from a first network node.

11. The method of claim 10, wherein the fibre channel switch maintains the last buffer advertisement provided to the first network node.

12. The method of claim 10, wherein the first network node maintains the last buffer advertisement received from the fibre channel switch.

13. The method of claim 8, wherein each buffer is configured to hold a single frame.

14. The method of claim 1, wherein the extended receiver ready signal further comprises an error detection code.

15. The method of claim 1, wherein the extended receiver ready signal is an ordered set.

16. The method of claim 15, wherein the extended receiver ready signal is transmitted after two idle ordered sets are transmitted.

17. A network node the network node comprising:
an output interface operable to transmit a plurality of frames to a fibre channel switch;
an input interface operable to receive an extended ready signal from the fibre channel switch, the extended ready signal including credit information;
a processor coupled to the input interface and the output interface, the processor configured to use the credit information to determine the number of buffers available to receive transmissions from the network node;
a memory operable to maintain a credit value indicating the number of buffers available to receive transmissions from the network node, a credit difference calculated by subtracting a last buffer advertisement from a current buffer advertisement received from the fibre channel switch and adding the credit difference to the credit value has been added.

18. The network node of claim 17, wherein the extended receiver ready signal further includes priority information.

19. The network node of claim 18, wherein the priority information is used to differentiate amongst eight levels of priority.

20. The network node of claim 17, wherein the input interface is further configured to receive an initialization extended receiver ready signal from the fibre channel switch before sending the plurality of frames.

21. The network node of claim 20, wherein the initialization extended receiver ready signal includes initialization credit information.

22. The network node of claim 20, wherein the initialization credit information is a buffer advertisement indicating an initial number of credits available to the network node.

23. The network node of claim 22, wherein each credit allows the network node to transmit a single frame.

24. The network node of claim 21, wherein the initialization credit information is a buffer advertisement for determining an initial number of buffers available for receipt of frames from a network node.

25. The network node of claim 17, wherein the credit information is a buffer advertisement for determining a relative number of credits available to the network node.

26. The network node of claim 25, wherein the credit information is a buffer advertisement for determining a relative number of buffers available for receipt of frames from a network node.

27. The network node of claim 26, wherein the fibre channel switch maintains the last buffer advertisement provided to the network node.

28. The network node of claim 26, wherein the network node maintains the last buffer advertisement received from the fibre channel switch.

29. The network node of claim 24, wherein each buffer is configured to hold a single frame.

30. The network node of claim 17, wherein the extended ready signal further comprises an error detection code.

31. The network node of claim 17, wherein the extended ready signal is an ordered set.

32. The network node of claim 31, wherein the extended ready signal is transmitted after two idle ordered sets are transmitted.

33. A system, comprising:
means for receiving a plurality of frames at a fibre channel switch from a first network node;
means for forwarding the plurality of frames;
means for modifying credit information associated with the first network node based on the number of frames forwarded; and
means for providing an extended receiver ready signal including the credit information to the first network node, the extended receiver ready signal including the credit information indicating to the first network node that a plurality of buffers are available to receive transmissions from the first network node, wherein the first network node does not send a frame to the fibre channel switch unless the first network node has a credit available, wherein the first network node further maintains a credit value indicating the number of buffers available to receive transmissions from the first network node, a credit difference calculated by subtracting a last buffer advertisement from a current buffer advertisement received from the fibre channel switch and adding the credit difference to the credit value.

* * * * *